United States Patent [19]
Bynum

[11] 3,794,789
[45] Feb. 26, 1974

[54] PRESSURE SENSITIVE CONTROL FOR PUMP REGULATOR

[76] Inventor: Johnnie J. Bynum, Star Rt., Box 98, Mineral Wells, Tex. 76067

[22] Filed: Nov. 2, 1972

[21] Appl. No.: 303,117

[52] U.S. Cl. ............ 200/83 Z, 200/82 R, 200/83 J, 417/17, 417/38
[51] Int. Cl. ...................... H01h 35/34, H01h 35/38
[58] Field of Search ..... 200/16 A, 82 R, 83 J, 83 Z; 137/558, 400; 417/38, 17

[56] References Cited
UNITED STATES PATENTS

| | | | |
|---|---|---|---|
| 1,541,112 | 6/1925 | Buvinger | 417/17 |
| 2,339,957 | 1/1944 | Smith | 417/17 X |
| 3,402,271 | 9/1968 | Maas | 200/83 Z |
| 3,043,929 | 7/1962 | Guthrie | 200/83 J |
| 2,757,361 | 7/1956 | Cameron | 200/16 A X |
| 3,319,571 | 5/1967 | Schaefer | 417/38 |

FOREIGN PATENTS OR APPLICATIONS

| | | | |
|---|---|---|---|
| 441,794 | 3/1912 | France | 200/83 J |

Primary Examiner—Robert K. Schaefer
Assistant Examiner—Robert A. Vanderhye
Attorney, Agent, or Firm—Wofford, Felsman & Fails, Mr. Arthur F. Zobal

[57] ABSTRACT

The specification discloses a water pumping system including an electric motor driven pump coupled to an underground water reservoir by way of conduits and to an uphold storage tank for storing water and having a pressure regulator for completing an electrical circuit to the pump motor from an electrical energy source when the water pressure falls below a preset low pressure level and for disconnecting the electrical circuit when the water pressure rises above a preset upper pressure level. Coupled between the source and the pump motor is a pressure switch sensitive to the water pressure of the system for disconnecting the electrical circuit in the event that the water pressure falls to a given lower pressure level below the preset low pressure level of the pressure regulator.

11 Claims, 6 Drawing Figures

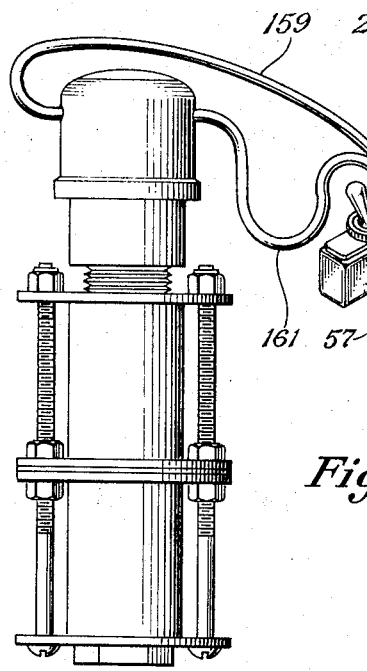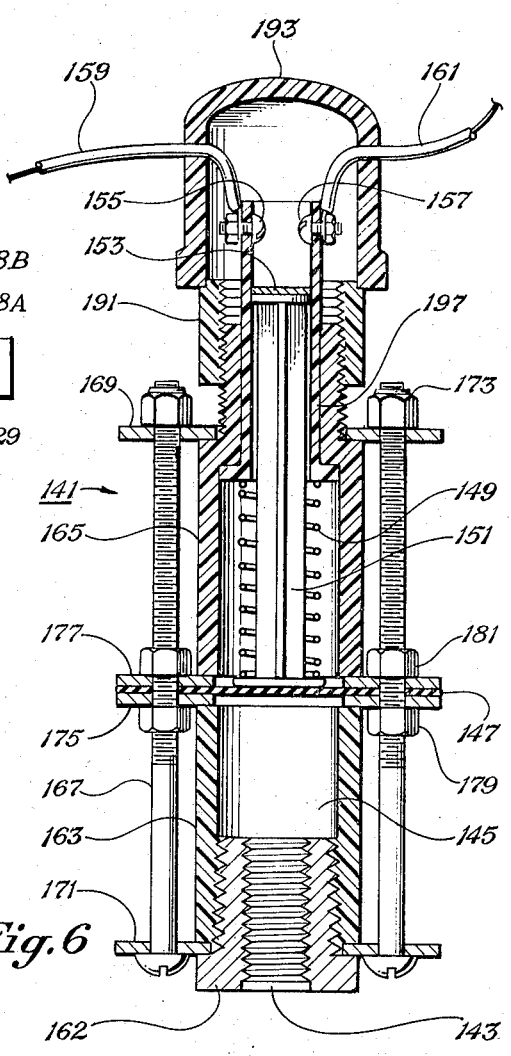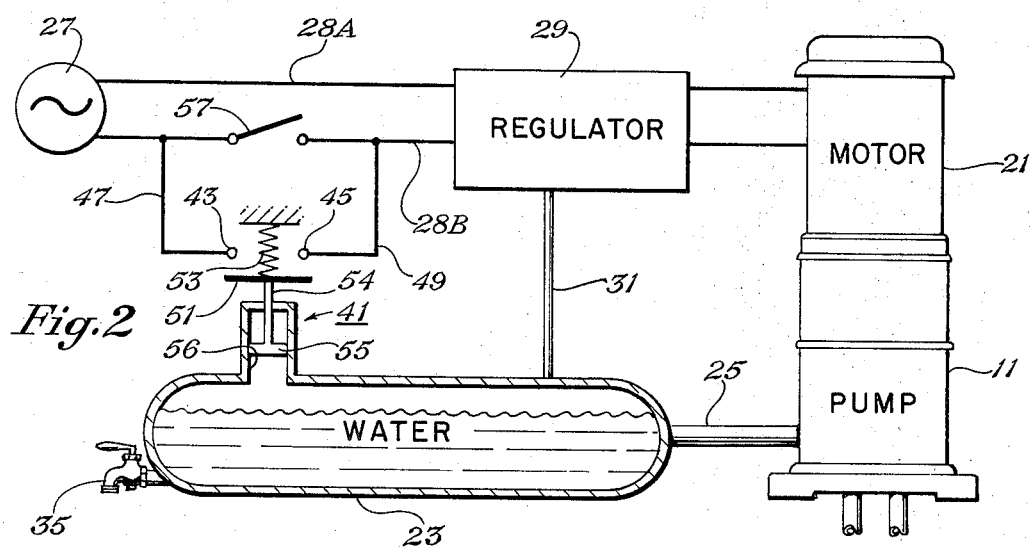

3,794,789

PRESSURE SENSITIVE CONTROL FOR PUMP REGULATOR

BACKGROUND OF THE INVENTION

This invention relates to a pressure switch for use in a water pumping system for shutting off the pump motor in the event that the water pressure falls too low to provide protection for the pump motor and pump.

The conventional electrically operated water pump for pumping water from subsurface formations is controlled by a pressure regulator to maintain the water storage tank full of water without the need for attendance by an operator. The regulator acts to start the pump motor to pump more water into the storage tank as the water is used and the water pressure falls below a preset low limit. When the storage tank is pumped full of water and the water pressure rises above a preset high limit the regulator acts to terminate operation of the pump motor.

This type of control system has resulted in damage to the pump motor and to the pump in emergency situations which may occur for example upon breakage of the water pipes or temporarily depletion of water from the subsurface water sands. When the water pressure in the storage tank drops below the low preset limit the regulator will "command" the pump motor to begin pumping operations. The pump however generally will be unable to fill the storage tank during the emergency whereby the pressure will remain below the low preset limit. Hence the pump motor will continue to run which will usually result in the pump motor "burning itself out" and/or damage to the pump itself.

SUMMARY OF THE INVENTION

It is an object of the present invention to provide a pressure switch for use in a water pumping system for disconnecting the electrical circuit to the pump motor in the event that the water pressure falls to a predetermined lower pressure level below the low preset level of the pressure regulator. The pressure switch comprises a housing having inlet means adapted to be in fluid communication with the fluid pressure of the water system. Two electrical contacts are located in the housing and have electrical leads coupled thereto and adapted to be connected between the power source and the pump motor. In addition a pressure sensitive means is located within the housing and sensitive to the fluid pressure within the inlet means for normally completing an electrical circuit between the contacts and for disconnecting the electrical circuit between the contacts when the water pressure falls to the predetermined lower pressure level below the low preset level of the pressure regulator.

In the embodiment disclosed, the pressure sensitive means comprises rod means having electrical conductive means at one end for movement in first and second directions toward and away from the contacts for engaging and disengaging the contacts. MOvable control means exposed to the fluid pressure in the inlet means is provided for normally maintaining the conductive means in conductive engagement with the contacts when the water pressure is above the predetermined lower pressure level. In addition, biasing means is provided for biasing the rod means in the second direction to move the electrical conductive means away from the contacts when the water pressure falls below the lower predetermined pressure level.

The movable control means may comprise a piston coupled to the rod means and slidable in a cylinder or a diaphragm adapted to control the rod means.

BRIEF DESCRIPTION OF THE DRAWINGS

FIG. 2 is a schematic illustration of one embodiment of the pressure switch incorporated in the water pumping system;

FIG. 5 is a plan view of another embodiment of the pressure sensitive switch of the present invention; and FIG. 6 is an enlarged cross-sectional view of the switch of FIG. 5.

DETAILED DESCRIPTION OF THE INVENTION

Figure 1:
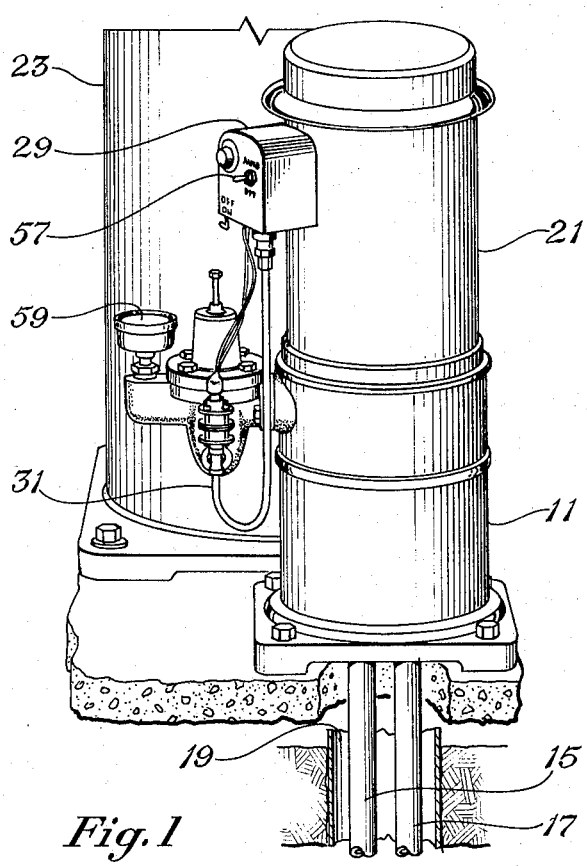
FIG. 1 illustrates a water pumping system employing the pressure switch of the present invention.
Figure 3:
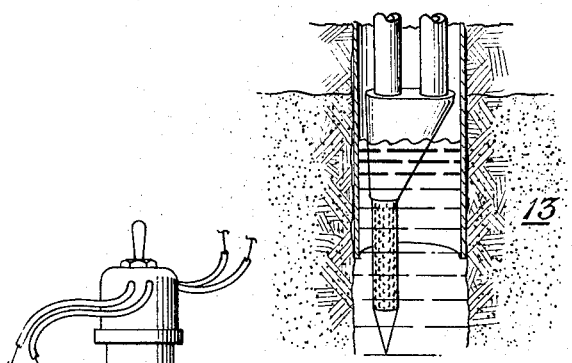
FIG. 3 is a plan view of one embodiment of the pressure switch of the present invention.

Referring now to FIGS. 1 and 2, the water pumping system comprises a water pump 11 coupled to a subsurface water reservoir 13 (a water bearing formation) by way of conduits 15 and 17 extending through a bore hole 19. The pump 11 is driven by an electrical motor 21 and pumps water from the formation 13 to an uphold storage or pressure tank 23 by way of conduit 25. An AC power source 27 supplies electrical energy to the motor 21 by way of conductors 28A and 28B and by way of a pressure regulator 29. The regulator is coupled to the tank by way of conduit 31 to sense for the water pressure within the tank 23. It can be coupled to the pump instead in the event that the pump is located uphole as in the case illustrated. The regulator 29 is a conventional pressure regulator and operates to complete the electrical circuitry to the motor 21 from the source 27 when the water in the tank 23 is used from an outlet illustrated at 35 and the water pressure drops below a low preset limit. When this occurs, the motor 21 will be energized to drive the pump 11 to pump more water into the tank 23. As the tank fills, the water pressure increases and when a preset upper limit is reached, the regulator 29 operates to disconnect the circuit from the source 27 to the motor 21 to terminate its operation. In one embodiment, the regulator 29 may be set to connect the circuit to the motor 21 when the pressure drops below 20 psi and to disconnect the circuit from the source 27 to the motor 21 when the pressure rises above 40 psi.

Coupled between the source 27 and the regulator 29 is a pressure sensitive switch 41 which is also coupled to water tank 23 to sense for the water pressure therein. It is to be understood that the switch 41 could be coupled to the pump 11 in the event it is located uphole. The switch 41 comprises two electrical contacts 43 and 45 coupled to the conductor 28B by way of conductors 47 and 49. Also provided is an electrical switch 51 which is controlled by a spring 53 and a rod 54 and piston 55 the latter of which operates in a cylinder 56. Cylinder 56 is coupled to the tank 23 whereby the cylinder 56 and piston 55 are in fluid communication with and are exposed to the fluid pressure in the tank 23. Thus the fluid pressure in the tank also controls the switch 51 through piston 55 and rod 54.

The spring 53 biases the rod 54 in a direction to urge the switch 51 away from the contacts 43 and 45. Normally the fluid pressure in the tank 23 will maintain a force on the piston 55 sufficient to overcome the bias of the spring 53 and maintain the switch 51 in contact with the contacts 43 and 45. The system 41 including the spring 53 is adjusted whereby the spring 53 will move the piston 55 and hence the switch 51 away from contacts 43 and 45 when the water pressure falls below a predetermined lower level below the low preset limit of the regulator 29. The lower pressure level of the switch 41 for example may be 18 psi.

In the examples given above where the low preset level of the regulator 29 is set at 20 psi, and the lower level of the switch 41 is set at 18 psi, the system will operate as follows. The water pressure in cylinder 56, when above 18 psi, will maintain the switch 51 in contact with the contacts 43 and 45. At this level the circuit from source 27 to the regulator 29 is complete whereby the regulator 29 has command over the motor 21. When the water pressure falls below 18 psi the spring 53 will move the piston and hence the switch 51 away from contacts 43 and 45 to disconnect the circuit from the regulator 29 to cut off the motor 21. Thus in emergency situations wherein the water pressure drops to an unusually low level beyond the control of the regulator 29, the switch 41 will disconnect the power to the pump motor to protect it and the pump from damage.

Also provided is a manually operated switch 57 which is used to by-pass the pressure switch 41 during start-up operations of the motor 21 until the desired pressure level is reached in the tank 23. For example during start-up operations, the switch 57 will be closed which will by-pass the pressure sensitive system 41 to allow the regulator 29 to complete a circuit to the motor 21 to drive the pump 11 to pump water into the tank 23. When the pressure builds up to the desired level, then the switch 51 will be manually opened to allow the pressure sensitive switch 41 automatically to control the regulator 29. A pressure gauge 59 is provided for monitoring purposes.

In FIG. 2, the cylinder 56 is illustrated as coupled to the top of the tank whereby piston 55 is directly exposed to the air pressure in the tank for control purposes. Since the air pressure is a function of the water pressure the piston 55 will be sensitive to the water pressure. If desired the cylinder 56 may be coupled to the tank at a point intermediate its top and bottom whereby water will enter the cylinder 56 to provide direct control over the piston 55.

Figure 4:
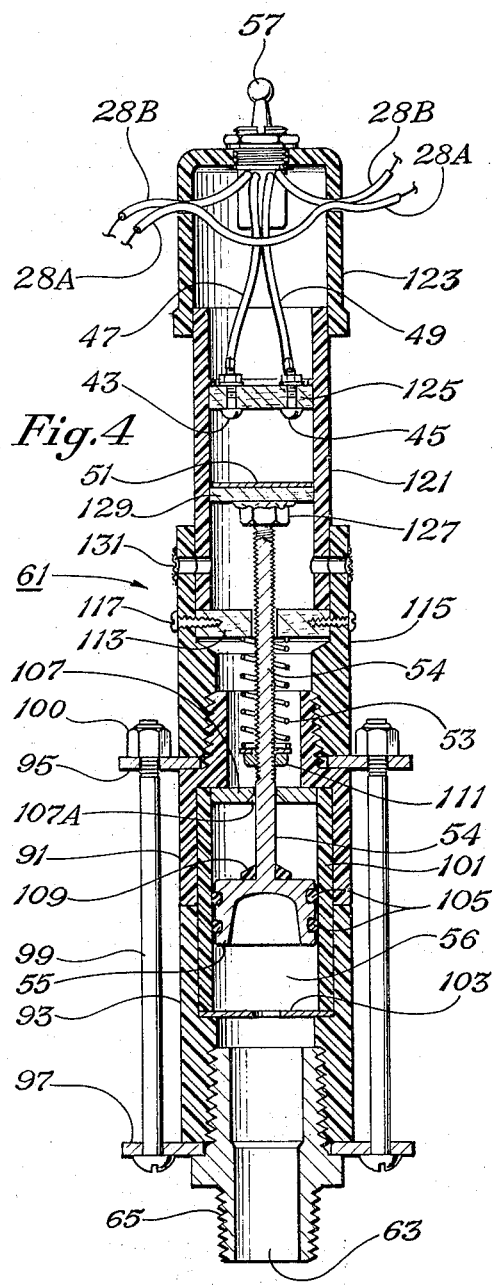
FIG. 4 is an enlarged cross-sectional view of the switch of FIG. 3.

Referring now to FIG. 4, one embodiment of the pressure sensitive switch will be described. It comprises a housing 61 having an inlet 63 formed by a brass fitting 65 which is adapted to be coupled to the water system to allow water or air pressure to enter the inlet 63 and flow to the cylinder 56 where it will be in fluid communication with the piston 55. Extending from the piston 55 is the piston rod 54 having the electrical switch or electrical conducting layer 51 at its other end adapted to engage two electrical contacts 43 and 45 located within the housing at the other end. The piston 55 and rod 54 preferably are of brass.

The electrical contacts 43 and 45 have conductors 47 and 49 extending therefrom and to the switch 57 to which the conductor 28B is to be coupled. The other conductor 28A also is illustrated in FIG. 4. The rod 54 is adapted to move toward the contacts 43 and 45 for engagement of the conducting surface 51 therewith to complete a circuit between the contacts 43 and 45 in the normal operation of the pressure sensitive switch as indicated above. In this respect, when water or air pressure enters the inlet 63 and the cylinder 56, the fluid pressure, when above 18 psi in one embodiment, will force the piston 55 and hence the rod 54 upward to cause the conducting surface 51 to engage the contacts 43 and 45.

The rod 54 is biased by the spring 53 in a direction to urge the rod 54 and hence the conducting surface 51 away from the contacts 43 and 45. When the fluid pressure decreases to a level below the lower limit which may be 18 psi as indicated above, the spring 53 will force the rod 54 and hence the conducting surface 51 away from the contacts 43 and 45 to disconnect the circuit between these contacts thereby disconnecting the electrical circuit to the regulator 29.

Other details of the structure of the pressure switch of FIG. 4 now will be described. The lower part of the housing 61 is formed by two plastic adapters 91 and 93 which are held together by washers 95 and 97 and bolts 99 extending through the washers and secured in place by way of nuts illustrated at 100. Fitting 65 is threaded into the lower end of the plastic adapter 93. The lower end of the fitting 65 is threaded for connection to the water system of interest. The cylinder 56 is formed by a plastic cylinder 101 which is located within the adapters 91 and 93. A washer 103 is held by the cylinder 101 against a shoulder formed in the inside of the adapter 93 to form a stop for the piston 55. O-rings 105 are provided around the piston 55 to form a seal between the piston and the inside of the cylinder 101. Coupled to the top end of the cylinder 101 is a washer 107 having an aperture 107A extending therethrough through which the rod 54 extends. A resilient seal 109 is coupled to the base of the piston 55 and around the rod 54 to form a seal between the washer 107 and the piston 55 and piston rod 54 when the piston 55 is moved against the washer 107 by the fluid pressure.

A nut 111 is threaded to the rod 54 for supporting one end of the spring 53, the other end of which is supported against a fiber washer 113 secured on the inside of another plastic adapter 115 which forms the middle portion of the housing. Brass screws 117 are threaded through the adapter 115 to secure the washer 113 in place. The lower end of the plastic adapter 115 is threaded to the top end of the adapter 91. The desired tension on the spring 53 may be obtained by threading the plastic adapter 115 toward or away from the adapter 91 and/or by adjusting nut 111 to set the desired lower limit of the pressure switch. As indicated above the lower limit may be 18 psi.

The upper portion of the housing 61 comprises a plastic cylinder 121 coupled to adapter 115 and to which is coupled an upper cap member 123 for supporting the switch 57. The contacts 43 and 45 are supported on the interior of the cylinder 121 by way of an electrically insulated plate 125 securely attached to the interior of the cylinder 121. The upper end of the rod 54 has a nut 127 threaded thereto which is cemented to an electrically insulated plate 129 to which the electrical conducting surface 51 is attached or cemented. Two apertures 131 are formed through the lower portion of the cylinder 121 and the upper portion of the adapter 115. These apertures are provided to allow water which may leak around the piston 55 to be discharged from the housing so that it will not affect the upper electrical system.

Referring now to FIGS. 5 and 6, the preferred embodiment of the pressure sensitive switch will be described. It comprises a housing 141 having an inlet 143 leading to a chamber 145 which is sealed by a flexible diaphragm 147. Inlet 143 is adapted to be coupled to the water system to allow the diaphragm 147 to be exposed to the fluid pressure of the system. Biased against the diaphragm by way of a spring 149 is an electrically insulated rod 151 which has a conducting surface 153 coupled to its other end and which is adapted to engage and move away from electrical contacts illustrated at 155 and 157. Coupled to these contacts are electrical conductors 159 and 161 which are adapted to be coupled to the switch 57 and to conductor 28B between the source 27 and the pressure regulator 29 as illustrated in FIG. 5. The spring 149 biases the rod 151 in a direction to urge the conducting surface 153 away from the contacts 155 and 157. When the fluid pressure in the chamber 145 is above the lower limit of 18 psi, the pressure will act on the diaphragm 147 to overcome the force of the spring 151 to maintain the rod 151 and hence the conducting surface 153 in contact with the contacts 155 and 157. When the fluid pressure decreases below this level, the spring 149 will move the rod 151 and hence the conducting surface 153 away from the contacts 155 and 157 to electrically disconnect the regulator from the power source 27.

In the embodiment disclosed, the housing is formed by a bushing 162 which is threaded into a plastic cylinder 163. The lower end of the bushing 162 is adapted to be threaded to a male connector for connection to the water system of interest. The diaphragm 147 extends across the top of the cylinder 163 and between the lower end of an upper plastic cylinder 165. The two cylinders 163 and 165 with the diaphragm 147 located therebetween are held together under pressure by way of bolts 167 extending through washers 169 and 171 placed against the opposite ends of the cylinders 163 and 165. The bolts 167 are held in place by way of nuts illustrated at 173. With this arrangement, a water tight seal is formed between the diaphragm 147 and the adjacent ends of the two cylinders 163 and 165.

Located around the cylinders 163 and 165 and on opposite sides of the diaphragm 147 are two washers 175 and 177 which are forced together under pressure by way of nuts illustrated at 179 and 181 threaded to the bolts 167.

The upper portion of the housing is formed by a plastic cylinder 191 attached to an upper cap 193. Cylinder 191 is threaded to the cylinder 165 as illustrated. Extending through the top portion of cylinder 165 is a plastic cylinder 197 to which the contacts 155 and 157 are mounted. The lower portion of the cylinder 197 has a shoulder which fits within the cylinder 165. The desired lower limit of the switch 141 is determined by the position at which the contacts 155 and 157 are placed along the length of the cylinder 197.

In one embodiment, the rod 151 comprises a plastic member which in cross-section transverse to its length is in the shape of a cross.

In the preferred embodiment, the pressure switch of the present invention is electrically coupled between the power source 27 and the regulator 29, however, it is to be understood that it could be electrically coupled between the regulator 29 and the motor 21 to provide protection for the pump motor and pump.

In one embodiment the pump 11 and pump motor 21 may be of the type manufactured by A. O. Smith Corporation, Serial No. 170, Model No. C48L2564 which includes the pressure regulator 29.

I claim:

1. In a water pumping system including an electric motor driven pump coupled to an underground water reservoir by way of conduit means and to an uphold storage means for storing water and having a pressure regulator for completing an electrical circuit to the pump motor from an electrical energy source for operating the pump motor when the water pressure falls below a predetermined low pressure level and for disconnecting the electrical circuit for stopping the pump motor when the water pressure rises above a predetermined upper pressure level, the combination therewith of: pressure switch means electrically coupled between the source and the pump motor and in electrical series with said pressure regulator and sensitive to the water pressure of the system for disconnecting the electrical circuit from the energy source to the motor in the event that the water pressure falls to a predetermined lower pressure level below said low pressure level of the pressure regulator.

2. The pressure switch means of claim 1, comprising:
   a housing having inlet means adapted to be in fluid communication with the fluid pressure of the water system;
   two electrical contacts having electrical leads coupled thereto and adapted to be connected between the source and the pump motor, and
   pressure sensitive means located within said housing and sensitive to the fluid pressure within said inlet means for normally completing an electrical circuit between said contacts and for disconnecting the electrical circuit between said contacts when the water pressure falls to a predetermined lower pressure level below said low pressure level of the pressure regulator.

3. The pressure switch means of claim 2 wherein said pressure sensitive means comprises:
   rod means having electrical conductive means at one end for movement in first and second directions toward and away from said contacts for engaging and disengaging said contacts,
   movable control means exposed to the fluid pressure within said inlet means for normally maintaining said conductive means in conductive engagement with said contacts when the water pressure is above said predetermined lower pressure level of said switch means, and
   biasing means for biasing said rod means in said second direction to move said electrical conductive means away from said contacts when the water pressure falls below said predetermined lower pressure level.

4. The pressure switch means of claim 3 wherein:
   said inlet means includes a cylinder adapted to be in fluid communication with the fluid pressure of the water system, and
   said control means comprises a piston coupled to said rod means and slidable in said cylinder.

5. The pressure switch means of claim 3 wherein said control means comprises a diaphragm adapted to be exposed to the fluid pressure in said inlet means.

6. A pressure switch to be coupled to a water pumping system having a source of electrical energy and a pressure regulator the latter of which is adapted to electrically complete a circuit from the source to an electric pump motor in the event the water pressure falls below a predetermined low pressure level and to disconnect the electrical circuit when the water pressure rises above a predetermined upper pressure level, comprising:

a housing having inlet means adapted to be in fluid communication with the fluid pressure of the water system, two electrical contacts having electrical leads coupled thereto and adapted to be connected between the source and the pump motor, pressure sensitive means located within said housing and sensitive to the fluid pressure within said inlet means for normally completing an electrical circuit between said contacts when said pressure switch is coupled to the water system and for disconnecting the electrical circuit between said contacts when the water pressure falls to a predetermined lower pressure level below said low pressure level of the pressure regulator and, manually controlled electrical switch means connected in parallel with said electrical contacts for providing an electrical flow path by-passing said electrical contacts upon closure of said manually controlled electrical switch means to allow the pump motor to be started and operated when little or no water pressure is present in the system.

7. The pressure switch of claim 6 wherein said pressure sensitive means comprises:

rod means having electrical conductive means at one end for movement in first and second directions toward and away from said contacts for engaging and disengaging said contacts, movable control means exposed to the fluid pressure within said inlet means for normally maintaining said conductive means in conductive engagement with said contacts when said pressure switch is coupled to the water system and when the water pressure is above said predetermined lower pressure level, and biasing means for biasing said rod means in said second direction to move said electrical conductive means away from said contacts when the water pressure falls below said predetermined lower pressure level.

8. The pressure switch of claim 7 wherein:

said inlet means includes a cylinder adapted to be in fluid communication with the fluid pressure of the water system, and said control means comprises a piston coupled to said rod means and slidable in said cylinder.

9. The pressure switch of claim 7 wherein said control means comprises a diaphragm adapted to be exposed to the fluid pressure in said inlet means.

10. A combination of claim 2 comprising:

manually controlled electrical switch means connected in parallel with said electrical contacts for providing an electrical flow path by-passing said electrical contacts upon closure of said manually controlled electrical switch means to allow the pump motor to be started and operated when little or no water pressure is present in the system.

11. A water pumping system comprising:

an electric motor driven pump coupled to an underground water reservoir by way of conduit means and to an uphole storage means for storing water, a pressure regulator for completing an electrical circuit to the pump motor from an electrical energy source for operating the pump motor when the water pressure falls below a predetermined low pressure level and for disconnecting the electrical circuit for stopping the pump motor when the water pressure rises above a predetermined upper pressure level, pressure switch means electrically coupled between the source and the pump motor and sensitive to the water pressure of the system for disconnecting the electrical circuit from the energy source to the motor in the event that the water pressure falls to a predetermined lower pressure level below said low pressure level of said pressure regulator, and electrical switch means connected in parallel with said pressure switch means for providing an electrical flow path by-passing said pressure switch means upon closure of said electrical switch means to allow the pump motor to be started and operated when little or no water pressure is present in the system.

* * * * *